R. P. MARCH.
Carriage-Spring.
No. 16,986. Patented Apr 7, 1857.
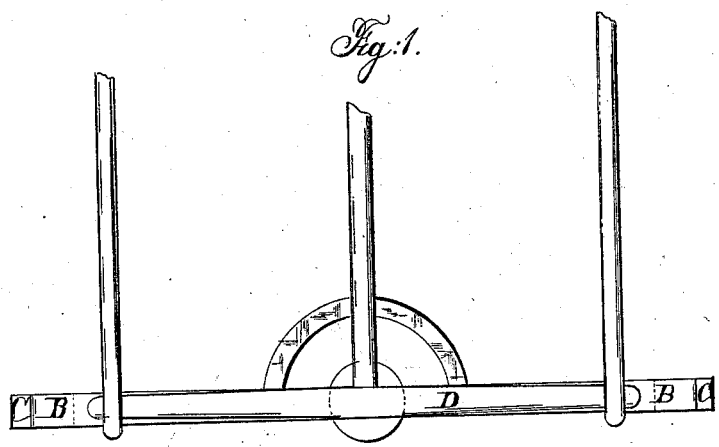
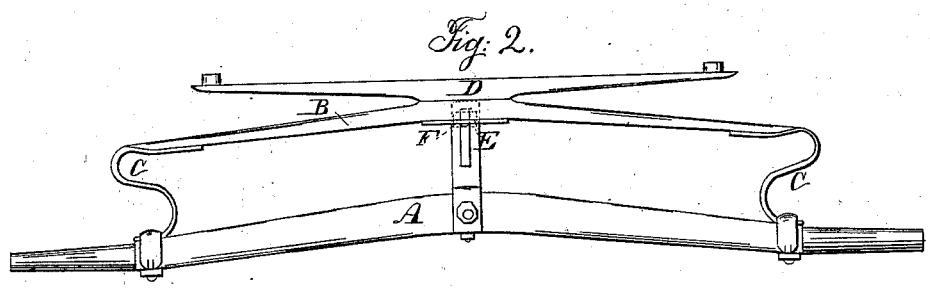

UNITED STATES PATENT OFFICE.

RINEHART P. MARCH, OF JEFFERSONVILLE, PENNSYLVANIA.

CARRIAGE-SPRING.

Specification of Letters Patent No. 16,986, dated April 7, 1857.

*To all whom it may concern:*

Be it known that I, RINEHART P. MARCH, of Jeffersonville, of the county of Montgomery and the State of Pennsylvania, have made certain useful Improvements in the Arrangement of Carriage-Springs; and I do hereby declare that the following is a full, clear, and exact description of the same, reference being had to the annexed drawings, and to the letters of reference marked thereon, in which—

Figure 1 represents a plan view of the front axle and spring. Fig. 2 represents an elevation of the back axle and spring.

Like letters refer to like parts in the different figures.

The nature of my invention consists in arranging the springs of carriages in the manner hereinafter described.

To enable others skilled in the art to make and use my invention I will now proceed to describe its construction and operation.

A represents the axle which is made in the usual form with the exception that it is made much lighter in the center and entirely of iron.

B represents the wooden spring which should be about the length of the axle between the journals. Said spring should be curved upward to increase its strength and elasticity. The ends of said spring are slightly curved upward for the purpose of accommodating the steel springs as will be more clearly understood by reference to the drawings Fig. 2.

C, C, represents the curved steel springs which are formed by bending flat bars of spring steel into the required form. The lower ends of said bars or springs are secured to the axle near the hub by means of a clamp while their upper ends are extended along the under surface of the spring far enough to give it a sufficient bearing. This portion of the spring is firmly secured to the wooden spring by means of rivets, or otherwise.

D represents the spring bar, which is secured to the spring by means of bolts passing through both.

E represents an upright slotted bar which is secured to the coupling bar near the back axle.

F represents a guide pin which is secured to the spring B and passes forward through the slot in upright bar E, where it is secured by means of a nut so that it is allowed to work freely in a vertical direction and thus serve to prevent any swaying motion of the carriage body that might occur.

The advantages presented in this invention are very numerous and of great importance not only to the manufacturer, but to the consumer. Among them may be enumerated, lightness, cheapness, and equal effectiveness and durability. The axle may be made much lighter and proportionally cheaper. Thus at the same time combining symmetry and beauty. There art many other advantages peculiar to this invention which are deemed so obvious that I will not comment further upon them.

I do not claim the combination of wooden, and metallic springs as new, nor do I claim the form of springs as new, as both have been known before, but What I do claim and desire to secure by Letters Patent is;

The arrangement of the combination spring B, C, axle A, slotted bar E, and guide pin F, for the purpose of supporting the spring and preventing lateral strain and for making of equal strength a much cheaper and lighter carriage than usual.

In testimony whereof I have hereunto set my hand and affixed my seal in presence of two subscribing witnesses.

RINEHART P. MARCH. [L. S.]

Witnesses:
CYRENIUS WILLIAMS,
REUBEN A. ELLIS.